United States Patent
Affaticati et al.

(10) Patent No.: US 8,047,504 B2
(45) Date of Patent: Nov. 1, 2011

(54) VALVE ACTUATOR WITH OMNIDIRECTIONAL, MOBILE AND WIRELESS REMOTE COMMUNICATION

(75) Inventors: Archimede Affaticati, Fiorenzuola D'Arda (IT); Giordano Alfieri, Fiorenzuola D'Arda (IT)

(73) Assignee: Biffi Italia, Piacenza (IT)

(*) Notice: Subject to any disclaimer, the term of this patent is extended or adjusted under 35 U.S.C. 154(b) by 78 days.

(21) Appl. No.: 12/489,743

(22) Filed: Jun. 23, 2009

(65) Prior Publication Data

US 2009/0256090 A1  Oct. 15, 2009

Related U.S. Application Data

(62) Division of application No. 11/249,270, filed on Oct. 14, 2005, now Pat. No. 7,559,529.

(30) Foreign Application Priority Data

Oct. 14, 2004  (IT) .................................. PR040016 U

(51) Int. Cl.
*F16K 31/02* (2006.01)
(52) U.S. Cl. .................... 251/129.04; 251/68; 251/69
(58) Field of Classification Search .................... 251/68, 251/69, 70, 71, 129.04
See application file for complete search history.

(56) References Cited

U.S. PATENT DOCUMENTS

| | | | |
|---|---|---|---|
| 5,588,636 A * | 12/1996 | Eichholz et al. | 251/129.04 |
| 5,960,807 A * | 10/1999 | Reyman | 137/1 |
| 6,491,062 B1 | 12/2002 | Croft | |
| 6,536,456 B2 | 3/2003 | Dickerson et al. | |
| 6,685,159 B1 | 2/2004 | Schnell | |
| 6,691,724 B2 | 2/2004 | Ford | |
| 6,955,333 B2 * | 10/2005 | Patterson et al. | 251/129.04 |
| 7,086,637 B2 * | 8/2006 | Perlo et al. | 251/129.04 |
| 2005/0067595 A1 | 3/2005 | Teti et al. | |

FOREIGN PATENT DOCUMENTS

DE       101 28 448       1/2003

* cited by examiner

*Primary Examiner* — John K Fristoe, Jr.

(57) ABSTRACT

A valve actuator has a set of sensors (2) for detection of the internal parameters of the actuator, a controller (3) for recording and storing the parameters and the operations performed by the actuator, a wireless module (5) to temporarily and omnidirectionally connect the actuator with a PDA (Personal Data Assistant) or a PC (pocket PC) (6) which controls the actuation thereof. The wireless module (5) further allows to download the collected data for analysis and to achieve an early diagnosis of any failure and/or inefficiency of the actuator. The wireless module (5) includes a transceiver operating at the frequency of 2.4 GHz.

11 Claims, 1 Drawing Sheet

VALVE ACTUATOR WITH OMNIDIRECTIONAL, MOBILE AND WIRELESS REMOTE COMMUNICATION

CROSS REFERENCE TO RELATED APPLICATIONS

This application is a division of application Ser. No. 11/249,270 filed on Oct. 14, 2005; which claimed priority to Italian Application No. PR 2004 U 000016 filed Oct. 14, 2004. The entire contents of each of the above-identified applications are hereby incorporated by reference.

BACKGROUND OF THE INVENTION

This invention relates to a valve actuator with omnidirectional, mobile and wireless remote communication.

The actuator is used for controlling valves by using a motor, which is in turn controlled by the controller within the actuator.

DESCRIPTION OF THE RELATED ART

These actuators are widely used wherever gas or liquid flows have to be controlled, hence in thermal and marine engineering, in oil, chemical, food industries and in many more fields.

Such actuators are generally formed by an output shaft driven by a reversible motor through a gearing system, e.g. gears allowing to rotate the shaft in either direction.

These actuators require the degree of opening of the valve to be known at any time, to properly control the consequent shaft rotation.

Also, all the information required for an immediate diagnosis of the functional condition and wear of the actuator must be retrieved therefrom.

SUMMARY OF THE INVENTION

The invention is characterized in that it uses a control and monitoring system through a wireless interface.

The term wireless system relates herein to a communication and monitoring technology, and to a number of control systems in which signals are transmitted through space, without using transmission wires or cables.

In a wireless system, radiofrequency transmission is mainly used.

The provision of said communication and control system on board an actuator allows data to be exchanged and commands to be transmitted in a non intrusive and mainly omnidirectional manner between the electric actuator and a PDA (Personal Data Assistant) or a personal computer (pocket PC).

This kind of transmission in not influenced by fixed obstacles, which can prevent optical visibility.

Therefore, connections may be established between systems over a range of about ten meters, whereby the operator may safely operate from a PDA (Personal Data Assistant) or PC (pocket PC), at a considerable distance from the actuator.

Thanks to the above, the actuator may also be located in inaccessible or dangerous areas, e.g. in areas containing explosive gases or flammable liquids If the dangerous area extends over a range greater than that of the relevant system, i.e. of more than about ten meters, the use of a fail-safe PDA (Personal Data Assistant) m enables the operator to communicate with the actuator even in said dangerous area.

The connection safety depends on the protocol being used for the wireless connection.

The wireless connection between the actuator and the PDA (Personal Data Assistant) or PC (pocket PC) can be established by equipping the actuator with a radio-frequency transceiver, such as Bluetooth or WI-FI.

A unique identification code is provided at any wireless communication location, or node, which code only applies to that node, so that any risk of interference or wrong command transmission is avoided.

Once the connection is established between the PDA (Personal Data Assistant) and the actuator, the following operations may be performed:

Configuring the operating parameters of the actuator;
Displaying the status of the actuator, with alarm and prealarm diagnostics;
Transmitting commands for the execution of functional tests;
Reading the actuator's rating, stored in the actuator;
Reading actuator's maintenance and statistic data;
Upgrading the firmware for the microprocessor that controls the actuator.

A controller is installed on board the actuator, whose software is capable of performing the above functions, as well as storing the collected data and organizing it chronologically, so that it can be read by a PDA (Personal Data Assistant).

The possibility of establishing a mobile and temporary connection with the actuator provides considerable advantages for the retrieval of statistic or diagnostic data to be used by a remote computer and analyzed thereby to establish predictive maintenance rules.

Data is collected by the controller of the actuator and stored in the fixed memory.

When needed, the operator may download such data; nevertheless, no real-time download is required, as data is stored by the actuator.

Once the data has been downloaded from the actuator into the PDA (Personal Data Assistant), it can be transferred to a remote computer for analysis.

Another advantage consists in that by transferring data via PDA (Personal Data Assistant) or PC (pocket PC), there is no need to transfer large quantities of data via BUS.

The object of this invention is to provide an actuator which can temporarily, omnidirectionally and uniquely communicate with a PDA (Personal Data Assistant) or a PC (pocket PC) to allow the accomplishment of functions and the retrieval of diagnostic and operation data, for later processing and generation of predictive maintenance rules.

One of the advantages of a mobile communication actuator is that it allows the operator to remain at a distance from the operating area, particularly when the area is dangerous.

Another advantage is that it allows analysis and early diagnosis by collecting the internal data of the actuator, thereby anticipating any failure and/or inefficiency of the actuator.

All these objects and advantages are achieved by the valve actuator with mobile and temporary remote communication of this invention, which is characterized by the annexed claims.

BRIEF DESCRIPTION OF THE DRAWINGS

These and other characteristics will be more apparent from the following description of a few embodiments, which are shown by way of example and without limitation in the accompanying drawings, in which.

DESCRIPTION OF THE PREFERRED EMBODIMENT

Figure 1:
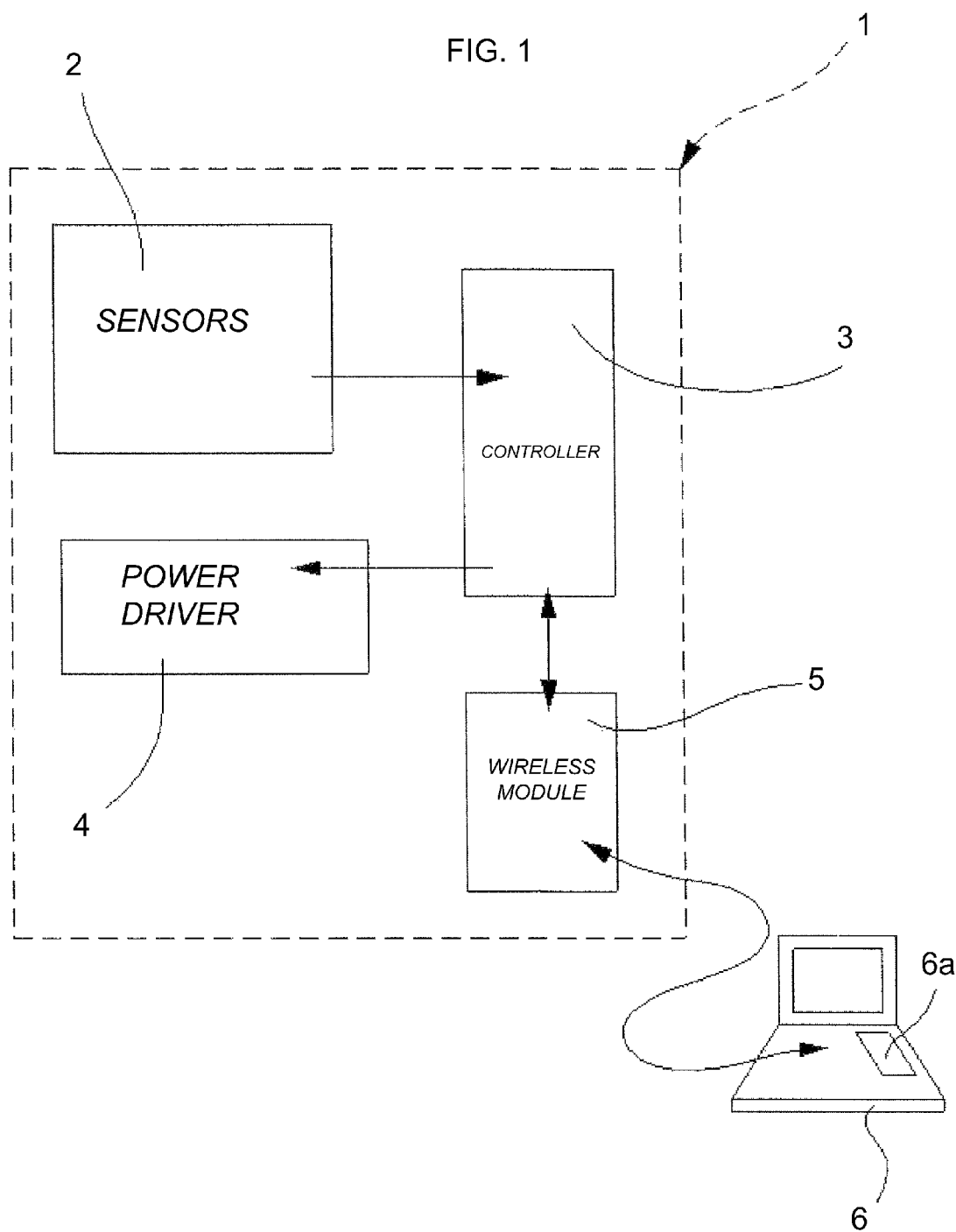
FIG. 1 is a block diagram of the actuator with the wireless communication integrated therein, according to this invention.

Referring to the FIGURE, 1 designates the assembly of components associated to the usual mechanical part of a valve actuator, i.e. a case which carries a disk that is fitted on the pin of the valve to be actuated.

Actuators are further known which have instead a pin to be fitted in a corresponding flange of the valve.

Back to the description of FIG. 1, the assembly 1 appears to be composed of a set of sensors 2, including: position, torque, temperature, voltage, current and speed sensors; information about the actuator is transmitted from the set of sensors 2, and stored in a controller 3.

This controller 3 may have a multiplicity of functions, e.g. data logger, real time clock, storage, torque curve recording, and else.

Control information also passes through the controller 3, to be transmitted to a power driver 4 to open and close the valve controlled by the actuator: these signals actuate the motor of the disk or of the output shaft of the actuator.

The assembly 1 also contains a wireless module 5 operating in the radio-frequency range, used by PDA (Personal Data Assistant) or PC (pocket PC).

The provision of the wireless module 5 characterizes the actuator, which may thus be remotely controlled, within the operating range of the module 5, from a PC (pocket PC) or PDA (Personal Data Assistant) 6, which is itself equipped with an appropriate wireless communication apparatus 6a.

Thanks to such wireless module 5, not only may the operator may control the actuator but, once he has reached the position and entered one or more codes to access the actuator, he may download the information stored in the meantime by the controller 3 and use it at a later time for actuator status analysis, he may predict the actuator's functional status for the future, and immediately correct any abnormality which might permanently damage it.

Therefore, these operations allow to know the actuator status at any time, even though data is seldom retrieved by the operator.

As an example of what may be achieved by the inventive actuator with a mobile and omnidirectional connection, without requiring the operator to access particular dangerous areas and to be permanently present, the following list of operations is provided:

Configuring the operating parameters of the actuator;
Displaying the status of the actuator with alarm and pre-alarm diagnostics;
Transmitting commands for the execution of functional tests;
Transmitting commands for the actuation of the valve shaft;
Reading the actuator's rating, stored in the actuator;
Reading actuator's maintenance and statistic data;
Upgrading the firmware for the microprocessor that controls the actuator.

The wireless module operates in the range of radio-frequencies, whereby it has the characteristic of providing an omnidirectional, temporary and mobile communication, as the PC (pocket PC) 6 will no longer be allowed to control and download the data from the actuator when it exits from the operating range of the wireless module 5.

The invention claimed is:

1. A valve actuator, comprising:
a set of sensors (2) for detection of internal parameters of the actuator;
a controller (3) for recording and storing data of said parameters and operations performed by the actuator; and
a wireless module (5) for connecting the actuator with a PDA or a PC (6),
wherein the controller (3) is operable to control valve actuation in accordance with control information received from said PDA or PC through the wireless module (5); and
wherein once the connection has been established between the wireless module (5) and the PDA or the PC (6), the device is operable to perform at least one of the following operations:
i. Configuring the operating parameters of the actuator;
ii. Displaying the status of the actuator with alarm and pre-alarm diagnostics;
iii. Transmitting commands for the execution of functional tests;
iv. Transmitting commands for the actuation of the valve shaft;
v. Reading the actuator's rating, stored in the actuator;
vi. Reading actuator's maintenance and statistic data; and
vii. Upgrading the firmware for the microprocessor that controls the actuator.

2. The valve actuator of claim 1, wherein the controller (3) is operable to provide an identification code allowing to open the wireless communication (5) to be opened with the PDA or the PC (6), while avoiding any interference with other actuators nearby.

3. The valve actuator of claim 1, wherein the wireless module (5) and the PDA or PC (6) can be only connected if they are within the signal zone of the wireless module (5).

4. The valve actuator of claim 1, wherein the controller (3) is operable to collect and store statistic or diagnostic data when no communication with the PDA or the PC (6) is possible through the wireless module (5).

5. The valve actuator of claim 1, wherein the wireless module (5) is a Bluetooth or a WI-FI wireless module.

6. A valve actuator system, comprising:
a PDA or a PC (pocket PC) (6),
a valve actuator comprising
i) a set of sensors (2) for detection of internal parameters of the actuator,
ii) a controller (3) for recording and storing data of said parameters and operations performed by the actuator, and
iii) a wireless module (5) for temporarily and omnidirectionally connecting the actuator with the PDA or the PC (6),
wherein the PDA or PC is operable to download via said wireless module (5) the data recorded and stored in said controller (3), for analysis and to generate an early diagnosis of any failure or inefficiency of the actuator,
wherein the controller (3) is further operable to control valve actuation in accordance with control information received from said PDA or PC through the wireless module (5),
wherein once the connection has been established between the wireless module (5) and the PDA or the PC (6), the valve actuator system is operable to perform at least one of the following operations:

i. Configuring the operating parameters of the actuator;
ii. Displaying the status of the actuator with alarm and pre-alarm diagnostics;
iii. Transmitting commands for the execution of functional tests;
iv. Transmitting commands for the actuation of the valve shaft;
v. Reading the actuator's rating, stored in the actuator;
vi. Reading actuator's maintenance and statistic data; and
vii. Upgrading the firmware for the microprocessor that controls the actuator.

7. The valve actuator system of claim 6, wherein the PDA or the PC (6) is equipped with a transceiver module (6*a*) correspond to said wireless module (5) for establishing the omnidirectional remote wireless connection.

8. A valve actuator control device, comprising:
a PDA or PC (6) configured to transmit control information to a valve actuator, the valve actuator, comprising:
a set of sensors (2) for detection of internal parameters of the actuator;
a controller (3) for recording and storing data of said parameters and operations performed by the actuator; and a wireless module (5) for temporarily and omnidirectionally connecting the actuator with the PDA or the PC (6),
wherein the PDA or PC is operable to download via said wireless module (5) the data recorded and stored in said controller (3), for analysis and to generate an early diagnosis of any failure or inefficiency of the actuator, wherein the controller (3) is further operable to control valve actuation in accordance with the control information received from said PDA or PC through the wireless module (5); and
wherein once the connection has been established between the wireless module (5) and the PDA or the PC (6), the device is operable to perform at least one of the following operations:
i. Configuring the operating parameters of the actuator;
ii. Displaying the status of the actuator with alarm and pre-alarm diagnostics;
iii. Transmitting commands for the execution of functional tests;
iv. Transmitting commands for the actuation of the valve shaft;
v. Reading the actuator's rating, stored in the actuator;
vi. Reading actuator's maintenance and statistic data; and
vii. Upgrading the firmware for the microprocessor that controls the actuator.

9. The device of claim 8, wherein the PC is a Pocket PC.

10. The valve actuator of claim 1, wherein the PC is a Pocket PC.

11. The system of claim 6, wherein the PC is a Pocket PC.

* * * * *